US006539196B2

(12) United States Patent
Ota et al.

(10) Patent No.: US 6,539,196 B2
(45) **Date of Patent: *Mar. 25, 2003**

(54) ROLL MEMBER AND FUSING DEVICE USING THE SAME

(75) Inventors: Mitsuhiro Ota, Susono (JP); Kazuo Kishino, Kawasaki (JP); Jiro Ishizuka, Numazu (JP); Osamu Soutome, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/472,889

(22) Filed: Dec. 28, 1999

(65) Prior Publication Data

US 2002/0019479 A1 Feb. 14, 2002

(30) Foreign Application Priority Data

Jan. 11, 1999 (JP) .......................................... 11-004408
Dec. 24, 1999 (JP) .......................................... 11-366558

(51) Int. Cl.[7] ....................... G03G 15/20; G03B 27/00; B32B 25/20

(52) U.S. Cl. ....................... 399/333; 399/324; 399/328; 399/330; 428/447; 492/18; 492/53; 492/54; 492/56

(58) Field of Search ................................ 524/413, 434, 524/435, 437, 588, 779, 780, 781, 783, 785, 786, 860, 861, 863; 428/447; 492/53, 56, 18, 54; 399/333, 328, 330, 324; 355/97

(56) References Cited

U.S. PATENT DOCUMENTS

| | | | | | |
|---|---|---|---|---|---|
| 4,777,087 | A | * | 10/1988 | Heeks et al. | 428/321.1 |
| 5,138,390 | A | | 8/1992 | Miyabayashi et al. | 355/283 |
| 5,319,427 | A | | 6/1994 | Sakurai et al. | 355/285 |
| 5,420,679 | A | | 5/1995 | Goto et al. | 355/285 |
| 5,563,695 | A | | 10/1996 | Sakurai et al. | 355/283 |
| 5,591,797 | A | * | 1/1997 | Barthel et al. | 524/493 |
| 5,608,508 | A | | 3/1997 | Kumagai et al. | 399/339 |
| 5,610,218 | A | * | 3/1997 | Funk et al. | 524/413 |
| 5,765,086 | A | | 6/1998 | Kishino et al. | 399/329 |
| 5,863,660 | A | * | 1/1999 | Kumagai et al. | 428/446 |
| 5,950,061 | A | | 9/1999 | Ota et al. | 399/333 |
| 5,966,578 | A | | 10/1999 | Soutome et al. | 399/333 |
| 6,297,302 | B1 | * | 10/2001 | Heeks et al. | 524/262 |

FOREIGN PATENT DOCUMENTS

| | | |
|---|---|---|
| JP | 62-256863 | 11/1987 |
| JP | 8-328342 | 12/1996 |
| JP | 9-71725 | 3/1997 |

* cited by examiner

*Primary Examiner*—Robert Dawson
*Assistant Examiner*—Jeffrey B. Robertson
(74) *Attorney, Agent, or Firm*—Fitzpatrick, Cella, Harper & Scinto

(57) ABSTRACT

The invention provides a roll member capable of preventing a sheet of recording paper from wrinkling. A metal compound MmXn and an inorganic fine powder are added to a silicone rubber layer forming the surface layer of the roll member. In the compound formula, M is a cation selected from among ions of Al, Sc, Cr, Fe, Co, Ni, Cu, Zn and Ga, and X is an anion selected from among ions of halogens, inorganic acids and organic acids.

8 Claims, 2 Drawing Sheets

ROLL MEMBER AND FUSING DEVICE USING THE SAME

BACKGROUND OF THE INVENTION

1. Field of the Invention

The present invention relates to a roll member and a fusing device using the roll member which are employed in image forming apparatuses such as copying machines and laser beam printers.

2. Description of the Related Art

A fusing device in electrophotographic image forming apparatuses, such as copying machines and laser beam printers, has a pair of rollers for gripping between them a recording material to which a toner image has been transferred, and fixes the toner image onto the recording material to provide a permanent image by applying heat and pressure to a toner. Those rollers for use in the fusing device each have an outer layer formed by coating over its surface a material that is superior in releasability, heat-resistance and wear-resistance, such as fluorocarbon resin or silicone rubber.

In electrophotographic image forming apparatuses for color copying machines in which importance is placed on image quality, particularly, there is a tendency to employ a roller whose surface is covered with silicone rubber. Also, Japanese Patent Laid-Open No. 9-71725 proposes one of such type of rollers in which a silicone rubber layer contains a metal compound to give the roller superior wear-resistance and heat-resistance. Further, Japanese Patent Laid-Open No. 8-328342 proposes a fusing roller in which an inorganic fine powder is added to a silicone rubber layer to improve the physical strength.

With recent widespread use of color printers, the demand for a reduction of the running cost has become increasingly critical. To satisfy such a demand, the amount of oil applied as a releasing agent to the silicone rubber must be reduced. A reduced amount of oil on the rubber surface changes the surface characteristics of the rubber itself and directly affects the operation of a fusing roller in various ways. As a primary effect, when a sheet of recording paper is gripped and transported by a pair of rollers, a frictional force developed between the rubber and the paper is so largely affected that the paper wrinkles depending on the image formed on the paper.

Specifically, a releasing agent is usually applied in a smaller amount to one of the paired rollers which is located opposite to the other roller held in contact with a releasing agent applicator. Depending on the image formed on the surface of the paper contacting the one roller theref 3ore, the paper is subjected to stresses and is forced to wrinkle. In the roller having a surface layer formed of a silicone rubber layer which contains a metal compound, particularly, the metal compound increases viscosity of the silicone rubber layer and then enhances affinity of the silicone rubber layer for oil. The coefficient of friction between a toner area (i.e., an area of the recording paper in which a toner image is formed) and the roller surface is reduced due to the presence of oil between them, while the coefficient of friction between a non-toner area (i.e., an area of the recording paper in which a toner image is not formed) is not so reduced because the nontoner area absorbs oil. Accordingly, the transport speed of the recording paper varies locally, thus causing the paper to wrinkle.

SUMMARY OF THE INVENTION

An object of the present invention is to provide a roll member which has wear resistance and is able to prevent a sheet of recording paper from wrinkling, as well as a fusing device employing the roll member.

To achieve the above object, the present invention provides a roll member having, as a surface layer, a silicone rubber layer containing a metal compound MmXn and an inorganic fine powder, wherein M is a cation selected from among ions of Al, Sc, Cr, Fe, Co, Ni, Cu, Zn and Ga, X is an anion selected from among ions of halogens, inorganic acids and organic acids, and m and n are each a positive integer on condition that the valence number of m×M is equal to the valence number of n×X.

Also, the present invention provides a fusing device comprising a fusing roller and a pressing roller to transport a recording material, on which a not-yet fused toner is carried, while gripping the recording material between the fusing roller and the pressing roller, thereby fusing the not-yet fused toner onto the recording material, wherein a surface layer of at least one of the fusing roller and the pressing roller is a silicone rubber layer containing a metal compound MmXn and an inorganic fine powder.

The present invention has succeeded in solving the problem of paper wrinkles, which occur due to addition of the metal compound, by adding the inorganic fine powder to the surface silicone rubber layer of the roll member. Such an effect of the inorganic fine powder presumably results from the fact that the coefficient of friction between a non-toner area of the recording paper and the roller surface is reduced by the presence of the inorganic fine powder in the roller surface.

The roll member according to the present invention is employed as the fusing roller, or the pressing roller, or each of the fusing roller and the pressing roller depending on the construction of the fusing device so that the occurrence of paper wrinkles can be effectively avoided.

DESCRIPTION OF THE PREFERRED EMBODIMENT

Figure 1:
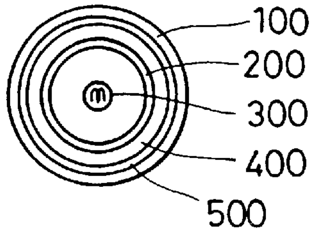
FIG. 1 is a schematic sectional view of a three-layered roller of the present invention.

Preferable materials of an inorganic fine powder added to a silicone rubber layer, which is formed as a surface layer of a roll member, are metal oxides and metal carbonates such as silica, alumina, titanium oxide, calcium carbonate, silicon oxide, aluminum oxide, cerium oxide, germanium oxide, zinc oxide, tin oxide, zirconium oxide, molybdenum oxide, tungsten oxide, strontium oxide, boron oxide, silicon nitride, calcium titanate, magnesium titanate, strontium titanate, phosphorus tungstate, phosphorus molybdate, magnesium carbonate, and aluminum carbonate.

The content of the inorganic fine powder in the surface layer is preferably in the range of 0.1 to 10 weight %, more preferably in the range of 3 to 8 weight %.

The mean particle size of the inorganic fine powder is preferably in the range of 0.5 nm to 10 $\mu$m. The mean particle size of the inorganic fine powder is determined by measuring the maximum size of each inorganic fine powder particle in an electron microscopic image as the size of the particle, and then calculating an arithmetic mean of the determined particles' sizes .

Metal elements of a metal compound mixed in silicone rubber for the roller member according to the present invention are selected from among elements which are effective in satisfactorily increasing heat resistance and wear resistance when added even in a small amount. Examples of those metal elements include Sc (scandium), Cr (chromium), Fe (iron), Co (cobalt), Ni (nickel), Cu (copper) and Zn (zinc) which belong to the fourth long period of the Periodic Table, as well as Al (aluminum) and Ga (gallium) which belong to the third group thereof. Also, metal organic acids may be used as materials of the metal compound in the form of metal organic salts such as salts of octyl acids and salts of naphthenic acids. Further, metal inorganic compounds usable as materials of the metal compound are metal inorganic salts containing, as counterparts, ions of inorganic acids such as halogen ions, a sulfuric acid ion and a nitric acid ion. The metal compound may have a structure of a hydrate, or of a complex including a ligand such as a compound including an aryl group, a compound including a carbonyl group, and a compound including an alkenyl group.

Among the materials listed above, particularly when they are mixed in silicone rubber before curing, metal salts such as metal organic salts and metal inorganic salts are preferable because these salts are easier to disperse. In this case, the metal salt is prepared in the form of a solution using water or an organic solvent, e.g., alcohol, and is then mixed and dispersed in silicone rubber. By removing the water or the organic solvent after that, the metal salt can be uniformly mixed and dispersed in the silicone rubber.

The amount by which the metal compound is mixed in silicone rubber is selected so as to fall within a range in which an effect of improving heat resistance and wear resistance of a silicone rubber molding is developed, the molding being employed as a fusing member made of silicone rubber, and in which deterioration of the silicone rubber with the lapse of time does not occur after addition of the metal compound. In other words, the content of a metal element in the metal compound with respect to the silicone rubber is preferably in the range of 3 to 300 ppm, more preferably in the range of 5 to 200 ppm. In consideration of releasability from a toner and a cleaning property, the silicone rubber preferably contains, as a component for polymerization, any normal-chain polysiloxane that has a high molecular weight and hence high viscosity. For example, the silicone rubber preferably contains, as a component for polymerization, 20 or more weight % of normal-chain polysiloxane that has vinyl groups at both ends and has viscosity not lower than 8000 Pa·s (25° C.). The normal-chain polysiloxane having vinyl groups at both ends includes, for example, polydialkylsiloxane, polydiarylsiloxane, and polyalkylarylsiloxane.

One example of the polydiphenylsiloxane is polydimethylsiloxane, one example of the polydiarylsiloxane is polydiphenylsiloxane, and one example of the polyalkylarylsiloxane is polymethylphenylsiloxane.

Another component for polymerization, which may be used as necessary in addition to the normal-chain polysiloxane having high viscosity and having vinyl groups at both ends, includes, for example, branched organosiloxane and normal-chain organopolysiloxane that has two or more vinyl groups in one molecule and has low viscosity not higher than 100 Pa·s (25° C.).

To form the fusing member made of silicone rubber in practice, the silicone rubber can be prepared as being polymerized by cross-linking the above normal-chain polysiloxane to the organopolysiloxane with a peroxide or a platinum catalyst.

In particular, the addition type silicone rubber polymerized by cross-linking with a platinum catalyst is superior in toner releasability to the silicone rubber polymerized by cross-linking with a peroxide, but it is inferior in heat resistance to the same. By mixing the metal compound to the former addition type silicone rubber before molding, both heat resistance and wear resistance (strength) can be improved without degrading toner releasability.

The present invention will be described below in detail with reference to the drawings.

FIG. 1 is a schematic sectional view showing one example of a fusing roller for use in the present invention. Referring to FIG. 1, numeral 300 denotes a halogen heater, 200 denotes a mandrel, 400 denotes an inner layer made of silicone rubber, 500 denotes an intermediate layer made of fluorine-containing rubber, and 100 denotes a surface layer formed of silicone rubber containing a metal compound and an inorganic fine powder therein.

Materials suitable for use as the mandrel 200 are, for example, aluminum and iron. Silicone rubber forming the silicone rubber layer may be addition type silicone rubber prepared by curing a polysiloxane mixture added with a heat-resistant inorganic filler, the polysiloxane mixture including 10 to 50 weight % of normal-chain polysiloxane that has vinyl groups at both ends and has a viscosity not lower than 8000 Pa·s at 25° C., and 50 to 90 weight % of reinforcing polyorganosiloxane in the resin form that has two or more vinyl groups, has a viscosity not lower than 1 Pa·s at 25° C., and contains, as structural units, a tetra- or tri-functional resin segment and a bi-functional resin segment.

An amount of a releasing agent required to be applied to the fusing roller is as small as not more than 20 mg/A4. The term mg/A4 is defined as the amount (in milligrams) of releasing agent carried away by a sheet of A4-size paper that passes through a fusing device. The releasing agent is applied to the fusing roller in an amount as much as the amount of the releasing agent carried away.

A full-color image forming apparatus and a fusing device for use in the apparatus will now be described, the fusing device being provided with at least one roll member of the present invention.

Figure 2:
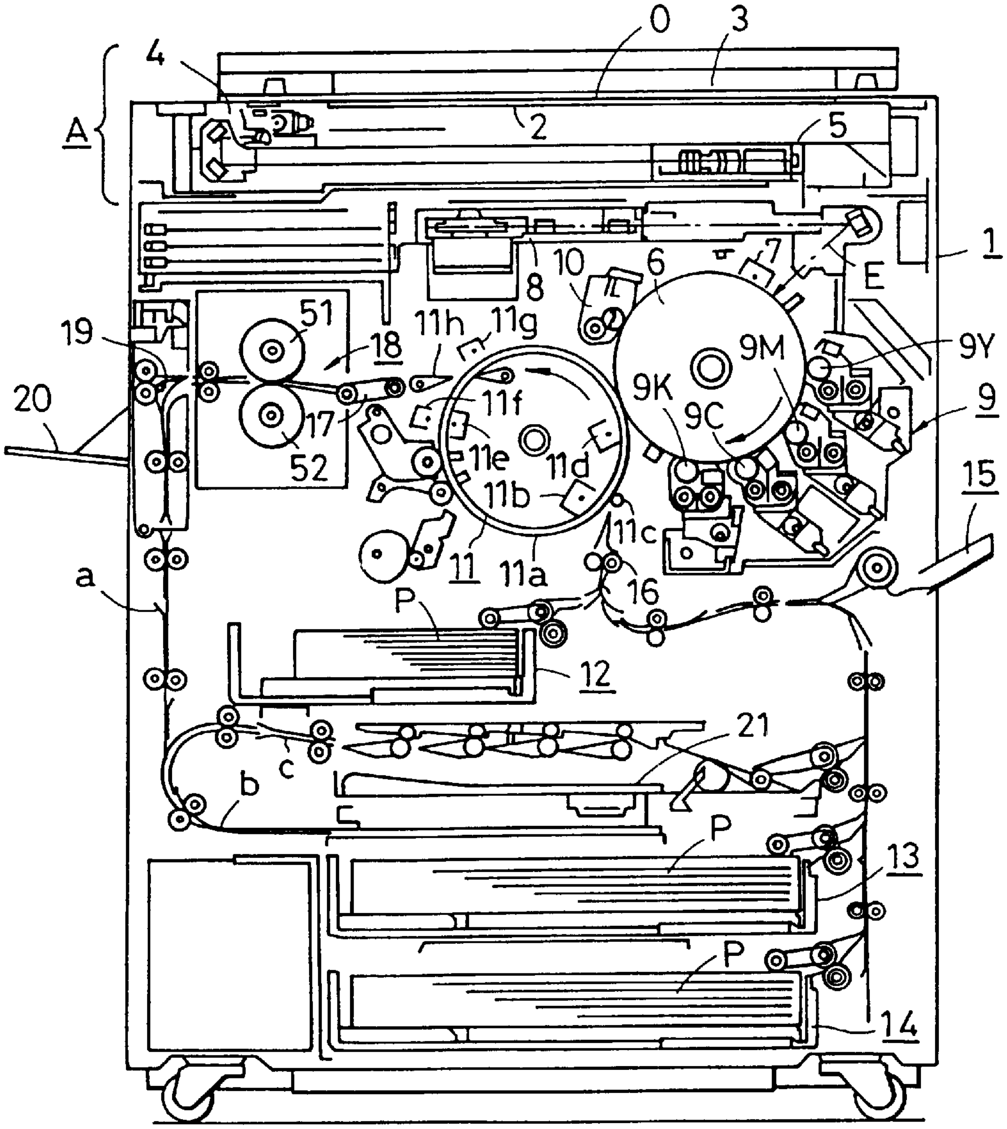
FIG. 2 is a schematic sectional view of an apparatus for forming an image on both sides of recording paper.

FIG. 2 is a schematic sectional view of the image forming apparatus.

The apparatus of this embodiment is constructed as an electrophotographic full-color image forming apparatus.

Numeral 1 denotes a housing of an apparatus body, and letter A denotes a document scanning and reading unit disposed at the top of the apparatus body housing. An original O is set on a document glass 2 in conformity with a predetermined apparatus reference mark while an image-formed surface of a sheet of the original O is faced down. A document retaining plate 3 is placed to lie over the original O. Then, by starting a read operation, a moving optical system 4 installed below the document glass 2 is moved from one end to the other end along the underside of the document glass 2 so that the image-formed surface of the original sheet set on the document glass 2 to face down is illuminated for scan. The light illuminated for scan and reflected by the original O is focused on a photoelectric reading unit 5 and is subjected to color separation using color separating filters. Through the color separation, the document image is photoelectrically read in the form of color image signals (time-serial electric digital pixel signals) which are stored in a memory circuit.

Numeral 6 denotes an electrophotographic photoconductive drum serving as an image carrier provided in an image forming section.

The photoconductive drum 6 has a diameter of 180 mm, for example, and is rotatably driven at a predetermined process speed (circumferential speed) in the clockwise direction indicated by an arrow.

Numeral 7 denotes a charger for uniformly charging the photoconductive drum 6 to a predetermined potential with a predetermined polarity. Numeral 8 denotes an image exposure means comprising a laser output unit, a polygon mirror, a lens system, mirrors, etc.

A surface of the photoconductive drum 6 charged by the charger 7 is exposed to and scanned by a laser beam E that is outputted from the image exposure means 8 while the laser beam E is modulated corresponding to the time-serial electric digital pixel signal supplied from the memory circuit. An electrostatic latent image corresponding to a scanned exposure pattern is thereby formed on the surface of the rotating photoconductive drum 6.

Numeral 9 denotes a combined developing device made up of four developing units; a cyan developing unit 9C containing a cyan toner, a magenta developing unit 9M containing a magenta toner, a yellow developing unit 9Y containing a yellow toner, and a black developing unit 9K containing a black toner. These four developing units 9C, 9M, 9Y and 9K are selectively actuated to act upon the surface of the rotating photoconductive drum 6 to develop the electrostatic latent image formed on it with the respective toners in succession.

Numeral 11 denotes a transfer drum which is disposed downstream of the combined developing device 9 and is rotatably driven in a forward direction relative to the rotation of the photoconductive drum 6 while contacting it substantially at the same circumferential speed as the photoconductive drum 6.

The transfer drum 11 has a diameter of 180 mm, for example. A recording material carrying sheet 11*a* serving as a recording material carrying means, which is formed of a film-like dielectric member, is cylindrically laid over an outer circumferential surface of the transfer drum 11 in an integral fashion.

Further, around the transfer drum 11, there are disposed an attracting corona charger 11*b* which serves as an attracting/charging means for attracting a recording material (transfer material) P onto the outer circumferential surface of the transfer drum 11; an attracting (abutting) roller 11*c* serving as an opposite electrode to the attracting corona charger 11*b;* a transfer corona charger 11*d* for transferring a toner image, formed on the side of the photoconductive drum 6, to the recording material attracted onto the transfer drum 11; an inner corona charger 11*e;* an outer corona charger 11*f;* a recording-material separating charger 11*g;* a recording-material separating pawl 11*h;* etc.

Numerals 12, 13 and 14 denote respectively first to third mechanisms for automatically feeding a recording material, and 15 denotes an inlet for manually feeding a recording material through it.

The recording material (transfer material) P is supplied one by one from any of the first to third recording-material automatically feeding mechanisms, and advanced to a pair of register rollers 16 through a predetermined sheet path which is defined by a guide plate, a pair of transport rollers, etc. Alternatively, the recording material P may be advanced to the pair of register rollers 16 through the recording-material manually feeding inlet 15.

Then, the recording material is advanced to the transfer drum 11 by the pair of register rollers 16 at the predetermined timing, and is wound over the outer circumferential surface of the transfer drum 11 to be held thereon in an electrostatically attracted manner for rotation with the transfer drum 11. The toner image is transferred to an outward facing surface of the recording material from the side of the photoconductive drum 6 under an action of the transfer corona charger 11*d.*

The surface of the photoconductive drum 6 having further rotated after the transfer of the toner image to the recording material P is cleaned by a cleaner (cleaning device) 10 for removing deposits, such as the toner, remaining after the transfer.

In a full-color image forming mode, a color toner image is formed as follows. Four image-forming and transferring cycles (1) to (4), described below, are successively performed with continued rotation of the photoconductive drum 6 and the transfer drum 11 for the respective colors:

(1) a process comprising the steps of charging the rotating photoconductive drum 6, irradiating the laser beam E for image exposure, the laser beam being modulated corresponding to a cyan image signal among the color-separated image signals of an objective color image, developing a resultant latent image by the cyan developing unit 9C, transferring a resultant cyan toner image to the recording material P, and cleaning the rotating photoconductive drum 6;

(2) a process comprising the steps of charging the rotating photoconductive drum 6, irradiating the laser beam E for image exposure, the laser beam being modulated corresponding to a magenta image signal among the color-separated image signals of the objective color image, developing a resultant latent image by the magenta developing unit 9M, transferring a resultant magenta toner image to the recording material P, and cleaning the rotating photoconductive drum 6;

(3) a process comprising the steps of charging the rotating photoconductive drum 6, irradiating the laser beam E for image exposure, the laser beam being modulated corresponding to a yellow image signal among the color-separated image signals of the objective color image, developing a resultant latent image by the yellow developing unit 9Y, transferring a resultant yellow toner image to the recording material P, and cleaning the rotating photoconductive drum 6; and (4) a process comprising the steps of charging the rotating photoconductive drum 6, irradiating the laser beam E for image exposure, the laser beam being modulated corresponding to a black image signal among the color-separated image signals of the objective color image, developing a resultant latent image by the black developing unit 9K, transferring a resultant black toner image to the recording material P, and cleaning the rotating photoconductive drum 6. Through the above four cycles, total four toner images, i.e., the cyan toner image, the magenta toner image, the yellow toner image, and the black toner image, are transferred to the outward facing surface (first surface) of the recording material P, which is wound around and held on the rotating transfer drum 11, in a mutually registered and superimposed relation. As a result, a color toner image corresponding to the objective color image is formed on the recording material P with mixing of the colors.

After the end of superimposed transfer of the toner images of the four colors to the same recording material P which is held on the rotating transfer drum 11, the charges on the recording material are canceled by the separating charger 11*g*, and the recording material is separated from the transfer drum 11 by the separating pawl 11*h* serving as a separating means. The separated recording material is advanced by a transport means 17 to a fusing device (a heat roller fusing device in this embodiment) 18 where the toner images of the four colors are fused together to the first surface of the recording material.

In a one-side image forming mode, the recording material including the image, which has been formed on one side (first surface) and fused thereto, is ejected on a paper output tray 20 through a paper outlet 19 after exiting the fusing device 18.

In a both-side image forming mode, the recording material including the image, which has been formed on one side and fused thereto, is introduced to a re-transport sheet path a after exiting the fusing device 18. The recording material is then sent to an intermediate tray 21 after being turned upper-side down through a switch-back sheet path b and a sheet path c. Thereafter, the recording material is advanced to the pair of register rollers 16 from the intermediate tray 21 and is supplied to the transfer drum 11 again. The recording material is wound around and held on the transfer drum 11 in such a condition that the first surface including the image formed thereon now faces inward and the second surface including no image faces outward.

As with the similar image forming processes made on the first surface, toner images separated into the four colors corresponding to a color image for the second surface are successively formed on the photoconductive drum 6 and transferred to the second surface of the recording material, whereby a color toner image is formed with mixing of the colors.

Subsequently, the recording material is separated from the transfer drum 11 and is advanced to the fusing device 18 again where the toner images of the four colors formed on the second surface of the recording material are fused together. The recording material including the full-color images formed on both sides is ejected on the paper output tray 20 through the paper outlet 19.

As an alternative, the recording material including the image, which has been formed on one side (first surface) and fused thereto, may be ejected on the paper output tray 20 and then introduced to the apparatus through the manually feeding inlet 15 again with the second surface of the recording material facing upward so that the image forming processes are carried out on the second surface.

Note that the order of forming the toner images separated into the four colors is not limited to the one described above in this embodiment.

In the case of copying a black-and-white image, only the black developing unit 9K is operated. It is also possible to selectively carry out a mode of copying a black-and-white image on both sides of a recording material, and a mode of forming a color image on one side of a recording material and forming a black-and-white image on the other side.

Figure 3:
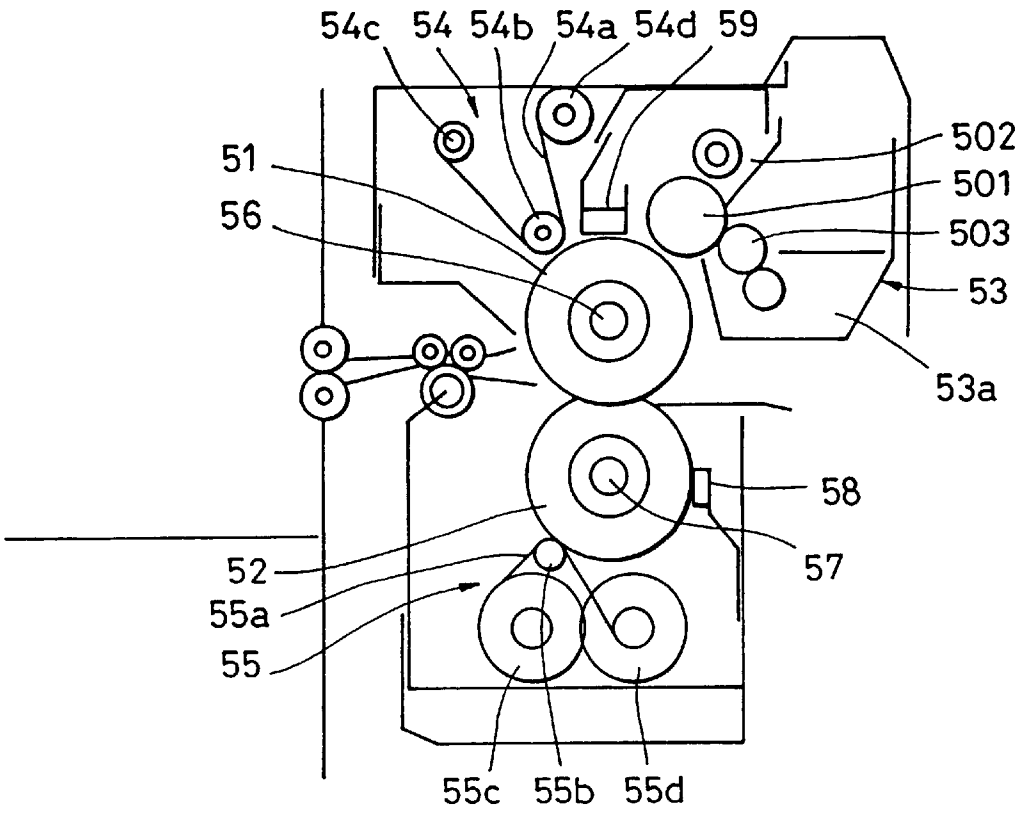
FIG. 3 is a schematic sectional view of a fusing device in FIG. 2.

FIG. 3 schematically shows one example of the fusing device 18 in the full-color image forming apparatus. The fusing device 18 comprises, as shown in FIG. 3, a fusing roller 51 serving as a fusing rotary member which includes a halogen heater 56 as a heating source provided inside the roller; a pressing roller 52 serving as a pressing rotary member which includes a halogen heater 57 as a heating source provided inside the roller and is rotatably held in pressure contact with the fusing roller 51 (the halogen heater 57 being not provided in some cases); an oil applicator 53 for applying silicone oil, as a releasing agent, to a surface of the fusing roller 51; and cleaning devices 54, 55 for removing the toner adhering to respective surfaces of the fusing roller 51 and the pressing roller 52.

The fusing roller 51 and the pressing roller 52 are each made up of an inner layer 400 formed around an aluminum mandrel 200 and made of HTV (high-temperature vulcanized) silicone rubber; an intermediate layer 500 formed around the inner layer 400 and made of fluorine-containing rubber for preventing intrusion of the oil; and a surface layer 100 formed around the intermediate layer 500 and made of LTV (low-temperature vulcanized) or RTV (room-temperature vulcanized) silicone rubber that has good compatibility with the silicone oil as a releasing agent. The fusing roller 51 and the pressing roller 52 cooperate to define a nip portion for transporting the recording material while gripping it between both the rollers.

Thus, in the full-color image forming apparatus, soft rollers made of elastic materials such as rubber are usually employed because of such a necessity that the toners must be sufficiently fused and mixed with each other in the fusing step.

Also, in the fusing device for use in a both-side full-color image forming apparatus, the surface layers of the fusing roller 51 and the pressing roller 52 are made of silicone rubber in most cases because both the fusing roller 51 and the pressing roller 52 are required to have toner releasability.

Heating operations of the halogen heaters 56, 57 are controlled by a temperature control means (not shown). The temperature control means controls the operations of the halogen heaters 56, 57 in accordance with the surface temperatures of the fusing roller 51 and the pressing roller 52 detected respectively by thermistors 58, 59.

The oil applicator 53 is movable into contact with and away from the fusing roller 51. Silicone oil in an oil reservoir 53*a* is moved by a drawing-up roller 503 toward an applying roller 501, and is applied to the surface of the fusing roller 51 from the applying roller 501.

The operation of moving the oil applicator 53 into contact with and away from the fusing roller 51 is controlled upon turning on/off of a solenoid (not shown). An amount of silicone oil applied to the fusing roller 51 is regulated by a control blade 502. The amount of the applied silicone oil is determined depending on the direction, angle, pressure, etc. at which the control blade 502 contacts the applying roller 501.

The cleaning devices 54, 55 comprise respectively cleaning webs 54*a*, 55*a* made of heat-resistant non-woven cloth Nomex (trade name) or fabricated by plating nickel on Nomex by the non-electrolytic plating process; rollers 54*b*, 55*b* for pressing the cleaning webs 54*a*, 55*a* toward the fusing roller 51 and the pressing roller 52; unreeling rollers 54*c*, 55*c* for leading out the cleaning webs 54*a*, 55*a*; and take-up rollers 54*d*, 55*d* for winding the cleaning webs 54*a*, 55*a* over themselves successively.

In the fusing device 18 thus constructed, when the recording material is transported to the fusing device 18, the fusing roller 51 and the pressing roller 52 are rotated at a constant speed. The recording material is pressed and heated from both front and back sides thereof while passing between the rolls 51 and 52, whereby the toner not yet fused is fused for permanent fixing. Then, the toner adhering to the fusing roller 51 and the pressing roller 52 are removed by the cleaning devices 54, 55 for cleaning the roller surfaces.

It is essential that the fusing and pressing rollers have a satisfactory degree of releasability.

Such a requirement must be more strictly satisfied particularly when oil is applied as a releasing agent in a reduced amount.

With respect to transportability of the recording material, frictional forces developed between each of an image area and a non-image area (blank area) of the recording material and the roller rubber take an important role. Generally, the image area including a fused image develops a smaller frictional force relative to the roller rubber and is more apt to slip because the paper surface in the image area contains oil.

On the other hand, the paper surface in the blank area develops a greater frictional force relative to the roller rubber, and the blank area is transported in a more tightly nipped condition because of closer contact between the rubber and the paper.

Figure 4:
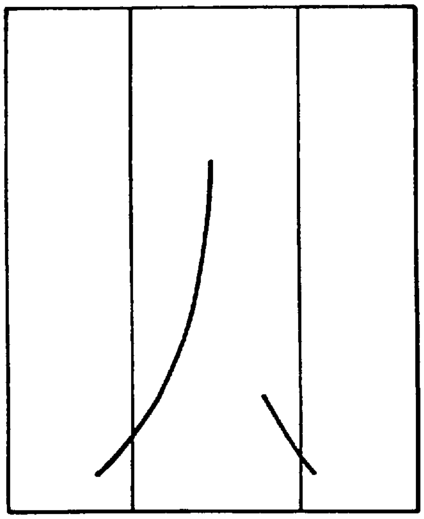
FIG. 4 is an illustration showing one example of wrinkles caused when the recording paper is transported to pass a pair of rollers.

Due to such different frictional forces developed by the roller surface with respect to the toner and the paper, there occurs a difference in transport speed between a central area and side edge areas of the paper, for example, depending on surface characteristics of the pressing roller, thus resulting in a torsion of the paper. As a result, the paper is forced to wrinkle. FIG. 4 shows one example of paper wrinkles. Such a paper wrinkle appears more noticeably when, in the both-side copying mode, a sheet of paper having both a toner area and a blank area contacts the pressing roller which is supplied with a reduced amount of oil.

Frictional forces developed by the toner surface and the paper surface with respect to the roller rubber change greatly depending on rubber materials.

EXAMPLE 1

<Fabrication of Fusing Roller>

The fusing roller was fabricated as follows. First, heat-resistant HTV silicone rubber (millable type) was bonded under vulcanization over an aluminum mandrel with an outer diameter of 56 mm, and was ground to obtain a desired outer diameter. Then, a fluorine-containing rubber coating was spray-applied over the silicone rubber with a thickness of about 50 $\mu$m and was dried at 150° C. for 30 minutes, thereby obtaining a roller coated with the fluorine-containing rubber. After applying a siloxane-based primer to a surface of the roller coated with the fluorine-containing rubber, a toluene-solvent diluted solution of addition type liquid silicone rubber, not yet cured and employed to form a roller surface layer, was coated over the roller. The roller was left to stand at room temperature for 30 minutes for volatilizing the toluene, and the silicone rubber was subjected to primary vulcanization at 130° C. for 1 hour and then to secondary vulcanization at 200° C. for 4 hours. As a result, a three-layered pressing roller having an outer diameter of 60 mm and a rubber length of 330 mm and coated with dimethyl silicone rubber having a thickness of 200 $\mu$m was obtained.

As the addition type liquid silicone rubber not yet cured and employed to form the roller surface layer, a liquid silicone rubber composition was employed which consisted of 40 weight % of normal-chain polydimethylsiloxane that had two vinyl groups at both ends and had viscosity of 10000 Pa·s at 25° C., and 60 weight % of branched polymethylsiloxane that had viscosity of 3 Pa·s at 25° C. and was represented by $[(CH_3)_3SiO_{1/2}]1.38[CH_2{=}CH(CH_3)_22SiO_{1/2}]0.44(SiO_2)$ (the composition containing, as a cross-linking agent, both organopolysiloxane having two or more hydrogen atoms bonded to silicon atoms in one molecule and 100 ppm of platinum in the form of a platinum catalyst, wherein the organopolysiloxane was contained in such an amount that a molar quantity of the above hydrogen atoms was 1.3 times a molar quantity of all the vinyl groups contained in the composition).

<Fabrication of Pressing Roller>

The pressing roller was fabricated as follows. First, heat-resistant HTV silicone rubber (millable type) was bonded under vulcanization over an aluminum mandrel with an outer diameter of 57 mm, and was ground to obtain a desired outer diameter. Then, a fluorine-containing rubber coating was spray-applied over the silicone rubber with a thickness of about 50 $\mu$m and was dried at 150° C. for 30 minutes, thereby obtaining a roller coated with the fluorine-containing rubber. After applying a siloxane-based primer to a surface of the roller coated with the fluorine-containing rubber, a toluene-solvent diluted solution of addition type liquid silicone rubber related to the present invention, not yet cured and employed to form a roller surface layer, was coated over the roller. The roller was left to stand at room temperature for 30 minutes for volatilizing the toluene, and the silicone rubber was subjected to primary vulcanization at 130° C. for 1 hour and then to secondary vulcanization at 200° C. for 4 hours. As a result, a three-layered pressing roller having an outer diameter of 60 mm and a rubber length of 330 mm and coated with dimethyl silicone rubber having a thickness of 200 $\mu$m was obtained.

The addition type liquid silicone rubber related to the present invention, not yet cured and employed to form the roller surface layer, was made up as follows. A liquid silicone rubber composition was prepared which consisted of 40 weight % of normal-chain polydimethyl-siloxane that had two vinyl groups at both ends and had viscosity of 10000 Pa·s at 25° C., and 60 weight % of branched polymethylsiloxane that had viscosity of 3 Pa·s at 25° C. and was represented by $[(CH_3)_3SiO_{1/2}]1.38[CH_2{=}CH(CH_3)_22SiO_{1/2}]0.44(SiO_2)$ (the composition containing, as a cross-linking agent, both organopolysiloxane having two or more hydrogen atoms bonded to silicon atoms in one molecule and 100 ppm of platinum in the form of a platinum catalyst, wherein the organopolysiloxane was contained in such an amount that a molar quantity of the above hydrogen atoms was 1.3 times a molar quantity of all the vinyl groups contained in the composition). To the above composition were added predetermined weight % of silica (mean particle size of 16 nm) as the inorganic fine powder and ferric chloride as the metal compound in an amount corresponding to 200 ppm on the basis of iron component, whereby the addition type liquid silicone rubber not yet cured was obtained. The ferric chloride was mixed in the form of a methanol solution while the mixture was stirred. After the mixing, methanol was completely removed.

<Fusing Device and Experimental Examples>

A fusing device similar to that shown in FIG. 3 was fabricated using the fusing roller and the pressing roller of the present invention, which were fabricated as described above. The fusing device was incorporated in an image forming apparatus (trade name: Color Laser Copier 800 (CLC800) by Canon Inc.) similar to that shown in FIG. 2, and 20000 sheets of copies of a color image were outputted in succession. The color image was copied under the following conditions:

original to be copied: magenta stripe pattern (stripe width of 100 mm) in a central area copy mode: full-color mode and both-side copying recording sheet: A3 size paper of 80 g/m$^2$ Also, fusing conditions were set as follows:

amount of releasing agent applied: 20 mg/A4 (300 cs dimethyl silicone oil)

fusing set temperature: 180° C.

nip pressure: total pressure of 980 N

From such experiments, results listed in Table 1 were obtained depending on the content of silica added to the surface layer of the pressing roller.

TABLE 1

| SILICA CONTENT | INCIDENCE OF PAPER WRINKLES | TONER OFFSET TO PRESSING ROLLER |
|---|---|---|
| 0 WEIGHT % | 95% | NO OFFSET UP TO 20000 SHEETS |
| 1 WEIGHT % | 56% | NO OFFSET UP TO 20000 SHEETS |
| 2 WEIGHT % | 13% | NO OFFSET UP TO 20000 SHEETS |
| 3 WEIGHT % | 0.8% | NO OFFSET UP TO 20000 SHEETS |
| 5 WEIGHT % | 0.1% | NO OFFSET UP TO 20000 SHEETS |
| 8 WEIGHT % | 0.1% | NO OFFSET UP TO 20000 SHEETS |
| 10 WEIGHT % | 0.1% | OFFSET OCCURRED AT 12000 SHEETS |

On the side of the fusing roller, the releasing agent was applied to the roller and a larger amount of the releasing agent was present on the roller surface than the side of the pressing roller, thus resulting in smaller coefficients of friction with respect to the paper and the toner. Accordingly, so long as the releasing agent was applied in necessary amount, the surface layer rubber of the fusing roller hardly took part in causing the paper to wrinkle. The releasing agent applied in an amount of more than 20 mg/A4 eliminated the problem of paper wrinkles attributable to the fusing roller.

With this example, as seen from Table 1, it was confirmed that the problem of paper wrinkles was avoided when the silica content in the surface layer of the pressing roller was in the range of 3 to 10 weight %. The reason was that by employing the roller according to the present invention as the pressing roller, a difference in coefficient of friction between a toner area and a non-toner area on the back side of the recording sheet was reduced. Also, when the silica content in the surface layer of the pressing roller was in the range of 0 to 8 weight %, an offset of the toner to the roller surface did not occur up to 20000 sheets of copies. However, when the silica content in the surface layer of the pressing roller was 10 weight %, toner releasability of the surface layer rubber lowered and an offset of the toner to the roller surface occurred after 12000 sheets of copies. It was therefore confirmed that the preferable silica content was in the range of 3 to 8 weight %.

Further, where the same silicone rubber as in the fusing roller of this example was employed to form the surface layer of the pressing roller, viscosity of the surface layer was not reduced because that silicone rubber did not contain the metal compound. As a result of outputting copies of a similar color image in succession, the occurrence of wrinkles was not found in any recording sheets.

EXAMPLE 2

<Fabrication of Fusing Roller>

As with Example 1, a three-layered fusing roller having an outer diameter of 60 mm and a rubber length of 330 mm and coated with dimethyl silicone rubber having a thickness of 200 μm was obtained.

The addition type liquid silicone rubber related to the present invention, not yet cured and employed to form the roller surface layer, was made up as follows. A liquid silicone rubber composition was prepared which consisted of 30 weight % of normal-chain polydimethyl-siloxane that had two vinyl groups at both ends and had viscosity of 10000 Pa·s at 25° C., and 70 weight % of branched polymethylsiloxane that had viscosity of 3 Pa·s at 25° C. and was represented by $[(CH_3)_3SiO_{1/2}]1.38[CH_2{=}CH(CH_3)_2 2SiO_{1/2}]0.44(SiO_2)$ (the composition containing, as a cross-linking agent, both organopolysiloxane having two or more hydrogen atoms bonded to silicon atoms in one molecule and 100 ppm of platinum in the form of a platinum catalyst, wherein the organopolysiloxane was contained in such an amount that a molar quantity of the above hydrogen atoms was 1.3 times a molar quantity of all the vinyl groups contained in the composition). To the above composition were added 3 weight % of calcium carbonate (mean particle size of 1 μm) as the inorganic fine powder and aluminum chloride as the metal compound in an amount corresponding to 100 ppm on the basis of aluminum component, whereby the addition type liquid silicone rubber not yet cured was obtained. The aluminum chloride was mixed in the form of a methanol solution while the mixture was stirred. After the mixing, methanol was completely removed.

<Fabrication of Pressing Roller>

As with Example 1, a three-layered pressing roller having an outer diameter of 60 mm and a rubber length of 330 mm and coated with dimethyl silicone rubber having a thickness of 200 μm was obtained.

As the addition type liquid silicone rubber not yet cured and employed to form the roller surface layer, a liquid silicone rubber composition was employed which consisted of 30 weight % of normal-chain polydimethylsiloxane that had two vinyl groups at both ends and had viscosity of 10000 Pa·s at 25° C., and 70 weight % of branched polymethylsiloxane that had viscosity of 3 Pa·s at 25° C. and was represented by $[(CH_3)_3SiO_{1/2}]1.38[CH_2{=}CH(CH_3)_2 2SiO_{1/2}]0.44(SiO_2)$ (the composition containing, as a cross-linking agent, both organopolysiloxane having two or more hydrogen atoms bonded to silicon atoms in one molecule and 100 ppm of platinum in the form of a platinum catalyst, wherein the organopolysiloxane was contained in such an amount that a molar quantity of the above hydrogen atoms was 1.3 times a molar quantity of all the vinyl groups contained in the composition).

<Fusing Device and Experimental Examples>

As with Example 1, a fusing device similar to that shown in FIG. 3 was fabricated using the fusing roller of the present invention and the pressing roller, which were fabricated as described above, and copies of a color image were outputted in succession. The color image was copied under the following conditions:

original to be copied: magenta stripe pattern (stripe width of 100 mm) in a central area copy mode: full-color mode and one-side copying recording sheet: A3 size paper of 75 g/$m^2$ Also, fusing conditions were set as follows:

amount of releasing agent applied: 10 mg/A4 (300 cs dimethyl silicone oil)

fusing set temperature: 185° C.

nip pressure: total pressure of 882 N

The above condition under which the paper must pass between the pair of rollers in a satisfactory manner is stricter than that in Example 1 with respect to the occurrence of paper wrinkles attributable to the fusing roller.

With this example, by employing the roller according to the present invention as the fusing roller, a difference in coefficient of friction between a toner area and a non-toner area on the front side of the recording sheet was reduced even when the releasing agent was supplied in smaller amount to the surface of the fusing roller. As a result, the fusing device showed such a sufficiently usable performance from the practical point of view that the incidence of paper wrinkles was less than 0.1% when 10000 sheets of copies were outputted in succession.

EXAMPLE 3

<Fabrication of Fusing Roller>

As with Example 1, a three-layered fusing roller having an outer diameter of 60 mm and a rubber length of 330 mm and coated with dimethyl silicone rubber having a thickness of 200 μm was obtained.

The addition type liquid silicone rubber related to the present invention, not yet cured and employed to form the roller surface layer, was made up as follows. A liquid silicone rubber composition was prepared which consisted of 45 weight % of normal-chain polydimethyl-siloxane that had two vinyl groups at both ends and had viscosity of 10000 Pa·s at 25° C., and 55 weight % of branched poly-methylsiloxane that had viscosity of 3 Pa·s at 25° C. and was represented by $[(CH_3)_3SiO_{1/2}]1.38[CH_2{=}CH(CH_3)_2 2SiO_{1/2}]0.44(SiO_2)$ (the composition containing, as a cross-linking agent, both organopolysiloxane having two or more hydrogen atoms bonded to silicon atoms in one molecule and 100 ppm of platinum in the form of a platinum catalyst, wherein the organopolysiloxane was contained in such an amount that a molar quantity of the above hydrogen atoms was 1.3 times a molar quantity of all the vinyl groups contained in the composition). To the above composition were added 3 weight % of aluminum oxide (mean particle size of 13 nm) as the inorganic fine powder and iron sulfate as the metal compound in an amount corresponding to 150 ppm on the basis of iron component, whereby the addition type liquid silicone rubber not yet cured was obtained. The iron sulfate was mixed in the form of a methanol solution while the mixture was stirred. After the mixing, methanol was completely removed.

<Fabrication of Pressing Roller>

As with Example 1, a three-layered pressing roller having an outer diameter of 60 mm and a rubber length of 330 mm and coated with dimethyl silicone rubber having a thickness of 200 μm was obtained.

The addition type liquid silicone rubber related to the present invention, not yet cured and employed to form the roller surface layer, was made up as follows. A liquid silicone rubber composition was prepared which consisted of 30 weight % of normal-chain polydimethyl-siloxane that had two vinyl groups at both ends and had viscosity of 10000 Pa·s at 25° C., and 70 weight % of branched poly-methylsiloxane that had viscosity of 3 Pa·s at 25° C. and was represented by $[(CH_3)_3SiO_{1/2}]1.38[CH_2{=}CH(CH_3)_2 2SiO_{1/2}]0.44(SiO_2)$ (the composition containing, as a cross-linking agent, both organopolysiloxane having two or more hydrogen atoms bonded to silicon atoms in one molecule and 100 ppm of platinum in the form of a platinum catalyst, wherein the organopolysiloxane was contained in such an amount that a molar quantity of the above hydrogen atoms was 1.3 times a molar quantity of all the vinyl groups contained in the composition). To the above composition were added 5 weight % of aluminum oxide (mean particle size of 13 nm) as the inorganic fine powder and iron sulfate as the metal compound in an amount corresponding to 200 ppm on the basis of iron component, whereby the addition type liquid silicone rubber not yet cured was obtained. The iron sulfate was mixed in the form of a methanol solution while the mixture was stirred. After the mixing, methanol was completely removed.

<Fusing Device and Experimental Examples>

As with Example 1, a fusing device similar to that shown in FIG. 3 was fabricated using the fusing roller and the pressing roller which were fabricated as described above. The fusing device was incorporated in an image forming apparatus (trade name: Color Laser Copier 800 (CLC800) by Canon Inc.) similar to that shown in FIG. 2, and copies of a color image were outputted in succession. The color image was copied under the following conditions:

original to be copied: magenta stripe pattern (stripe width of 100 mm) in a central area copy mode: full-color mode and both-side copying recording sheet: A3 size paper of 75 g/$m^2$ Also, fusing conditions were set as follows:

amount of releasing agent applied: 10 mg/A4 (300 cs dimethyl silicone oil)

fusing set temperature: 185° C.

nip pressure: total pressure of 882 N

The above condition under which the paper must pass between the pair of rollers in a satisfactory manner is stricter than that in Example 1 with respect to the occurrence of paper wrinkles in the both-side copying mode.

The incidence of paper wrinkles was however less than 0.1% when 10000 sheets of copies were outputted in succession.

With this example, by employing the roller according to the present invention as each of the fusing roller and the pressing roller, a difference in coefficient of friction between a toner area and a non-toner area on each of the front and back sides of the recording sheet was reduced even when the releasing agent was supplied in smaller amount to the surface of the fusing roller. As a result, it was confirmed that the both-side copying was enabled with stability and the fusing device had sufficiently usable performance from the practical point of view.

What is claimed is:

1. A fusing device comprising a fusing roller and a pressing roller to transport a recording material, on which a not-yet fused toner is carried, while gripping the recording material between said fusing roller and said pressing roller, thereby fusing the not-yet fused toner onto the recording material, and an applicator that applies a releasing agent to a surface of said fusing roller in an amount not more than 20 mg/A4, wherein a surface layer of at least one of said fusing roller and said pressing roller is a silicone rubber layer containing a metal compound MmXn and an inorganic fine powder, wherein M is a cation selected from the group consisting of ions of Al, Sc, Cr, Fe, Co, Ni, Cu, Zn and Ga, X is an anion selected from the group consisting of ions of halogens, inorganic acids and organic acids, and m and n are each a positive integer on condition that the valence number of m×M is equal to the valence number of n×X.

2. A fusing device according to claim 1, wherein M of said metal compound MmXn is a cation selected from the group consisting of ions of Fe and Al.

3. A fusing device according to claim 1, wherein the content of M of said metal compound MmXn is 3 to 300 ppm on the basis of the silicone rubber.

4. A fusing device according to claim 1, wherein said inorganic fine powder is selected from the group consisting of silica, alumina, titanium oxide and calcium carbonate.

5. A fusing device according to claim 1, wherein said inorganic fine powder is contained in said surface layer in the proportion of 3 to 8 weight %.

6. A fusing device according to claim 1, wherein said inorganic fine powder has a mean particle size of 5 nm to 10 μm.

7. A fusing device according to claim 1, wherein said silicone rubber contains, as a component for polymerization, 20 or more weight % of normal-chain polysiloxane having vinyl groups at both ends and having viscosity not lower than 8000 Pa·s at 25° C.

8. A fusing device according to claim 7, wherein said normal-chain polysiloxane having vinyl groups at both ends is at least one selected from the group consisting of polydialkylsiloxane, polydiarylsiloxane, and polyalkylaryl-siloxane.

* * * * *

UNITED STATES PATENT AND TRADEMARK OFFICE

CERTIFICATE OF CORRECTION

PATENT NO. : 6,539,196 B2
DATED : March 25, 2003
INVENTOR(S) : Mitsuhiro Ota et al.

It is certified that error appears in the above-identified patent and that said Letters Patent is hereby corrected as shown below:

Column 1,
Line 49, "theref 3ore," should read -- therefore, --.
Line 61, "nontoner" should read -- non-toner --.

Signed and Sealed this

Eighth Day of June, 2004

JON W. DUDAS
*Acting Director of the United States Patent and Trademark Office*